(12) United States Patent
Lee et al.

(10) Patent No.: US 9,886,812 B2
(45) Date of Patent: Feb. 6, 2018

(54) ANTENNA COMBINING FOR MASSIVE MIMO SCHEME

(71) Applicant: LG ELECTRONICS INC., Seoul (KR)

(72) Inventors: Kilbom Lee, Seoul (KR); Jaehoon Chung, Seoul (KR); Ilmu Byun, Seoul (KR); Hyunsoo Ko, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 14/907,792

(22) PCT Filed: Feb. 21, 2014

(86) PCT No.: PCT/KR2014/001423
§ 371 (c)(1),
(2) Date: Jan. 26, 2016

(87) PCT Pub. No.: WO2015/020290
PCT Pub. Date: Feb. 12, 2015

(65) Prior Publication Data
US 2016/0164593 A1   Jun. 9, 2016

Related U.S. Application Data

(60) Provisional application No. 61/863,919, filed on Aug. 9, 2013.

(51) Int. Cl.
*G07F 11/50* (2006.01)
*G07F 9/00* (2006.01)
(Continued)

(52) U.S. Cl.
CPC ............. *G07F 11/50* (2013.01); *G07F 9/00* (2013.01); *G07F 11/38* (2013.01); *H04B 7/0417* (2013.01); *H04B 7/0691* (2013.01); *H04B 7/0404* (2013.01)

(58) Field of Classification Search
CPC . G07F 9/00; G07F 11/50; G07F 11/38; H04B 7/0417; H04B 7/0691;
(Continued)

(56) References Cited

U.S. PATENT DOCUMENTS 9,503,231 B2 * 11/2016 Gaal ................. H04L 5/0023
2010/0246638 A1   9/2010 Mehta et al.
(Continued)

FOREIGN PATENT DOCUMENTS

EP   2346190   7/2011
EP   2584850   4/2013

OTHER PUBLICATIONS

European Patent Office Application Serial No. 14834419.5, Search Report dated Feb. 21, 2017, 10 pages.
(Continued)

*Primary Examiner* — Charles C Jiang
*Assistant Examiner* — Oussama Roudani
(74) *Attorney, Agent, or Firm* — Lee, Hong, Degerman, Kang & Waimey

(57) ABSTRACT

In this disclosure, methods for antenna combining to meet the pilot requirement of the massive MIMO system, and apparatuses for the same are provided. In a user equipment (UE) perspective of view, the UE transmits first pilot signals via each of multiple antennas of the UE, and receives antenna combining information from a base station. Here, the antenna combining information combines the multiple antennas into one or more antenna groups based on the first pilot signals, and each of orthogonal sequences is allocated (Continued)

to each of the antenna groups. The UE transmits second pilot signals using the allocated orthogonal sequences for each of the antenna groups. The second pilot signals can be used for estimating downlink channel from the base station to the UE.

20 Claims, 12 Drawing Sheets

(51) Int. Cl.
  *H04B 7/0417* (2017.01)
  *H04B 7/06* (2006.01)
  *G07F 11/38* (2006.01)
  *H04B 7/0404* (2017.01)

(58) Field of Classification Search
  CPC ...... H04B 7/0404; H04B 7/0874; H04B 7/04; H04B 7/26; H04B 7/08; H04B 7/0452; H04B 7/06; H04L 5/00
  See application file for complete search history.

(56) References Cited

U.S. PATENT DOCUMENTS

| | | | |
|---|---|---|---|
| 2011/0200143 A1* | 8/2011 | Koo | H04B 7/0697 375/299 |
| 2011/0267972 A1 | 11/2011 | Yoon et al. | |
| 2012/0269146 A1 | 10/2012 | Pajukoski et al. | |
| 2013/0107838 A1* | 5/2013 | Li | H04W 74/0866 370/329 |
| 2013/0182594 A1 | 7/2013 | Kim et al. | |

OTHER PUBLICATIONS

PCT International Application No. PCT/KR2014/001423, Written Opinion of the International Searching Authority dated Jun. 20, 2014, 11 pages.

\* cited by examiner

FIG. 3
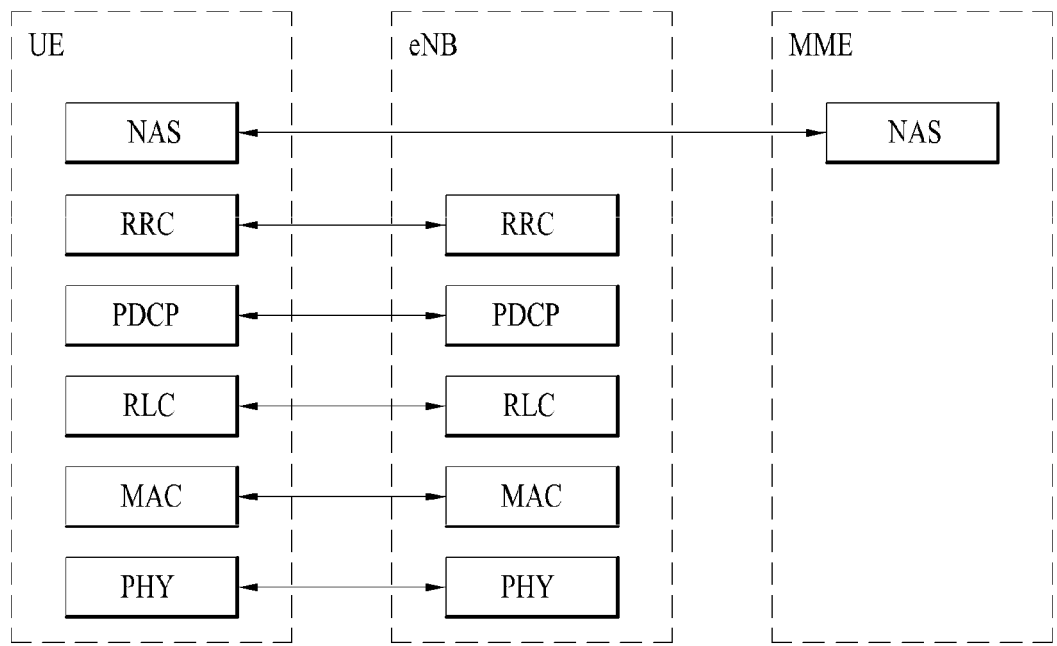
(a) contol - plane protocol stack
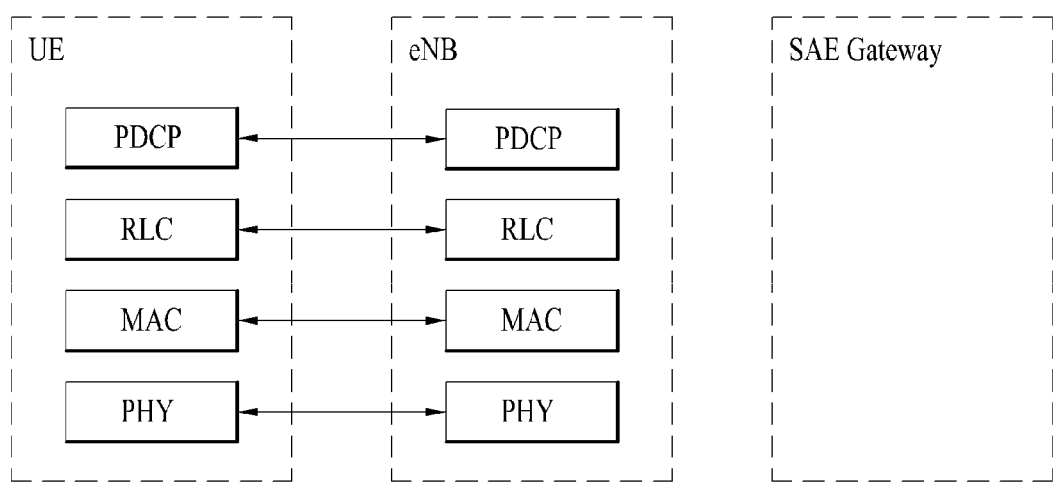
(b) user - plane protocol stack

FIG. 6
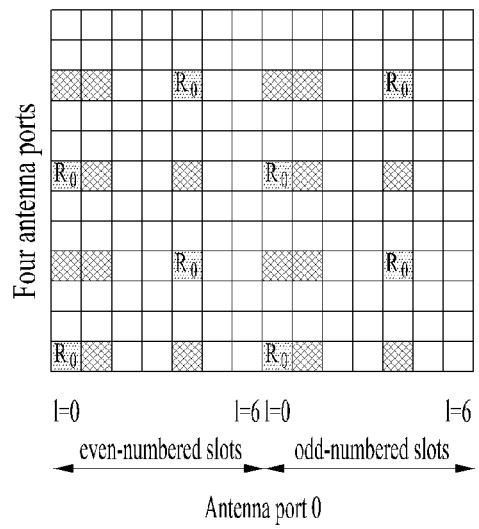
Antenna port 0
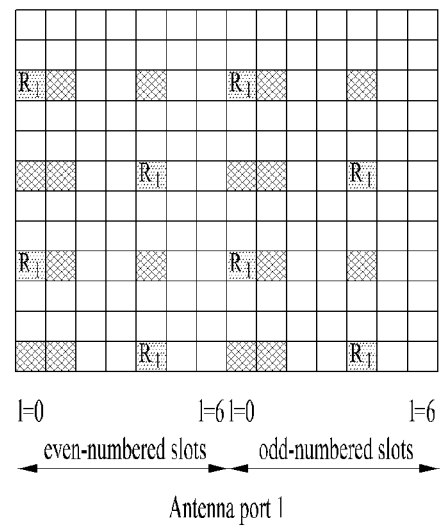
Antenna port 1
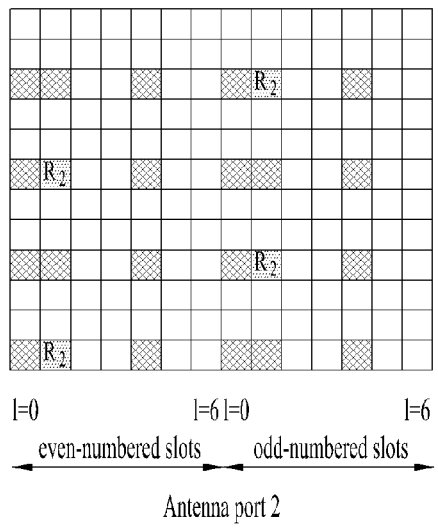
Antenna port 2
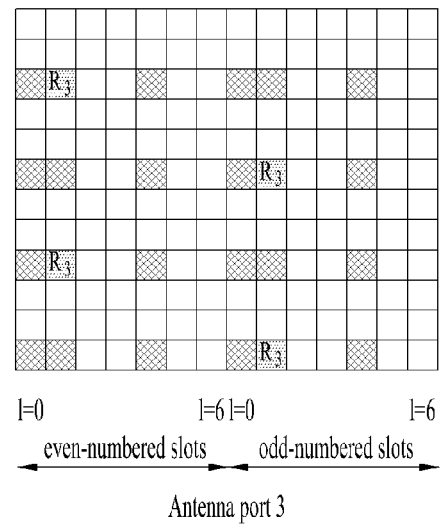
Antenna port 3

ANTENNA COMBINING FOR MASSIVE MIMO SCHEME

CROSS-REFERENCE TO RELATED APPLICATIONS

This application is the National Stage filing under 35 U.S.C. 371 of International Application No. PCT/KR2014/001423, filed on Feb. 21, 2014, which claims the benefit of U.S. Provisional Application No. 61/863,919, filed on Aug. 9, 2013, the contents of which are all hereby incorporated by reference herein in their entirety.

TECHNICAL FIELD

The present invention relates to a wireless communication system, and more particularly, to methods for antenna combining to meet the pilot requirement of the massive MIMO system, and apparatuses for the same.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for antenna combining for the massive MIMO system, and apparatuses for the same that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system employing a massive MIMO (Multiple Input Multiple Output) scheme is provided. The method comprises: transmitting first pilot signals via each of multiple antennas of the UE; receiving antenna combining information from a base station, wherein the antenna combining information combines the multiple antennas into one or more antenna groups based on the first pilot signals, wherein each of orthogonal sequences is allocated to each of the antenna groups; and transmitting second pilot signals using the allocated orthogonal sequences for each of the antenna groups, wherein the second pilot signals are used for estimating downlink channel from the base station to the UE.

In another aspect of the present invention, a method for a base station to operate in a wireless communication system employing a massive MIMO (Multiple Input Multiple Output) scheme is provided. The method comprises: receiving first pilot signals transmitted via each of multiple antennas of a user equipment (UE); transmitting antenna combining information to the UE, wherein the antenna combining information combines the multiple antennas of the UE into one or more antenna groups based on the received first pilot signals, wherein each of orthogonal sequences is allocated to each of the antenna groups; receiving second pilot signals generated by using the allocated orthogonal sequences for each of the antenna groups; and estimating downlink channel from the base station to the UE based on the received second pilot signals.

In another aspect of the present invention, a user equipment (UE) operating in a wireless communication system employing a massive MIMO (Multiple Input Multiple Output) scheme is provided. The UE comprises: multiple antennas; a transceiver configured to transmit and receive signals via the multiple antennas; and a processor being connected to and controlling the transceiver, wherein the processor is configured to transmit first pilot signals via each of multiple antennas, receive antenna combining information from a base station, wherein the antenna combining information combines the multiple antennas into one or more antenna groups based on the first pilot signals, wherein each of orthogonal sequences is allocated to each of the antenna groups, and transmit second pilot signals using the allocated orthogonal sequences for each of the antenna groups, wherein the second pilot signals are used for estimating downlink channel from the base station to the UE.

In still another aspect of the present invention, a base station operating in a wireless communication system employing a massive MIMO (Multiple Input Multiple Output) scheme is provided. The base station comprises: multiple antennas; a transceiver configured to transmit and receive signals via the multiple antennas; and a processor being connected to and controlling the transceiver, wherein the processor is configured to receive first pilot signals transmitted via each of multiple antennas of a user equipment (UE); transmit antenna combining information to the UE, wherein the antenna combining information combines the multiple antennas of the UE into one or more antenna groups based on the received first pilot signals, wherein each of orthogonal sequences is allocated to each of the antenna groups; receive second pilot signals generated by using the allocated orthogonal sequences for each of the antenna groups; and estimate downlink channel from the base station to the UE based on the received second pilot signals.

In the above invention, the antenna combining information can be determined to minimize a correlation between effective channels of the antenna groups.

The method can further comprise: transmitting/receiving a preferred antenna combining method to/by the base station, wherein the UE may determine the preferred antenna combining method based on an amount of data to be transmitted.

The method can further comprise: receiving/transmitting modified antenna combining information from the base station, wherein the modified antenna combining information can be based on the second pilot signals.

Preferably, the UE can be within a first UE group, and the UE may transmit the second pilot signals at different time period other than a time period where a UE of a second UE group transmits the second pilot signals.

The base station can comprise multiple antennas, and a number of multiple antennas can be greater than a threshold number.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3GPP radio access network standard.

FIG. 6 shows a case when the base station having 4 antennas transmits cell-specific reference signal for channel estimation.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a time division duplex (TDD) scheme in the present specification, the embodiments of the present invention may be easily modified and applied to a half-duplex FDD (H-FDD) scheme or a frequency division duplex (FDD) scheme.

Figure 1:
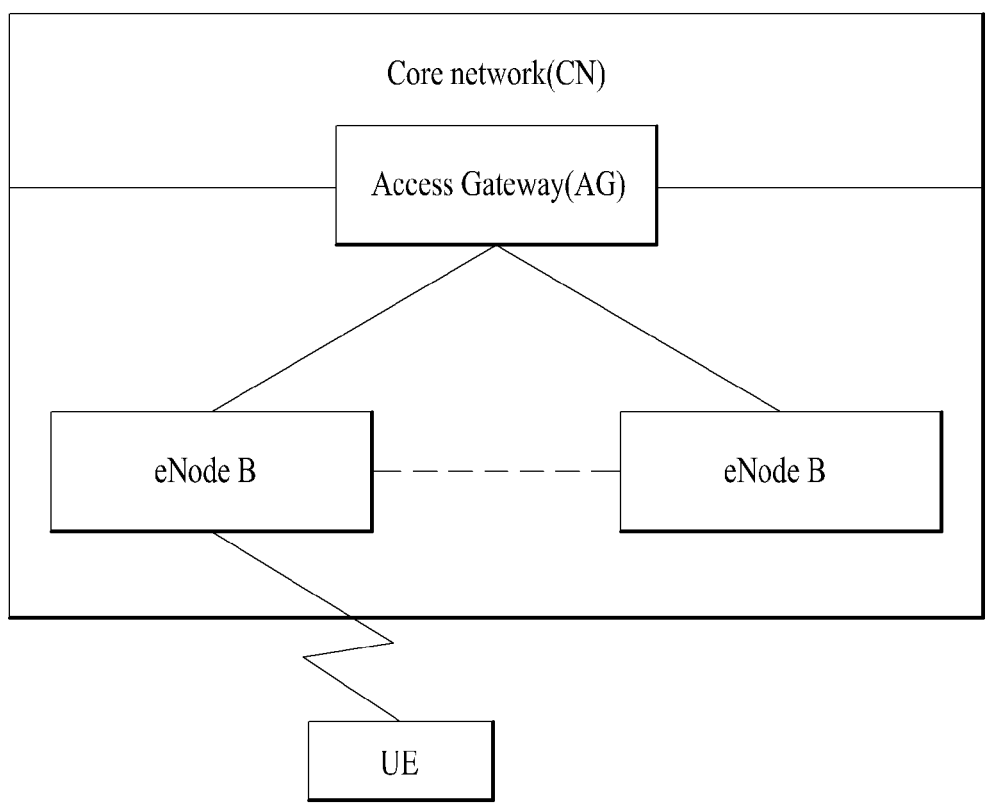
FIG. 1 is a diagram showing a network structure of an Evolved Universal Mobile Telecommunications System (E-UMTS) as an example of a wireless communication system.
Figure 2:
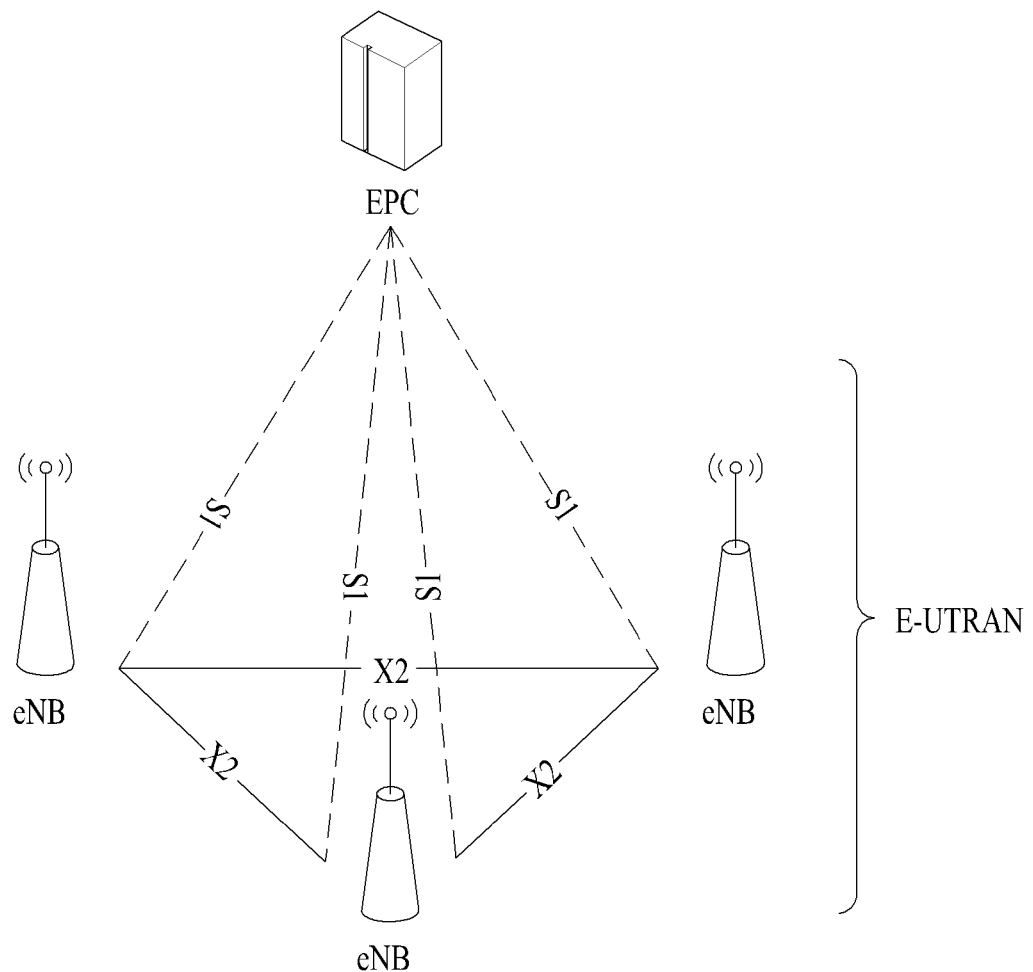
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
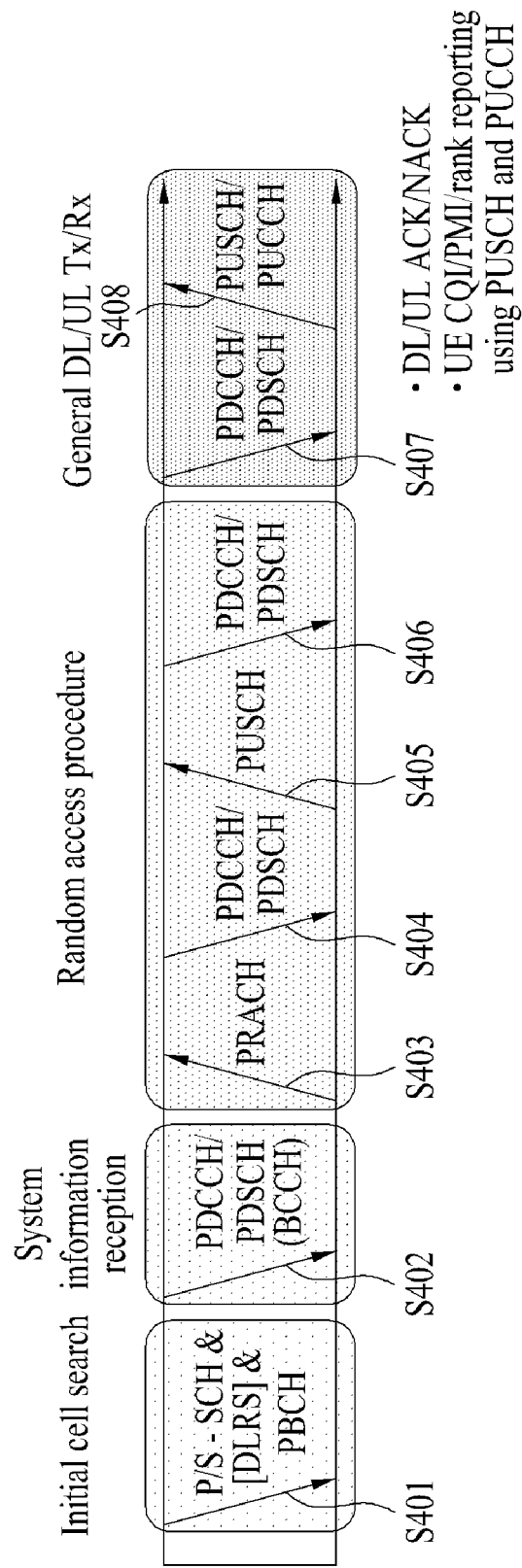
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
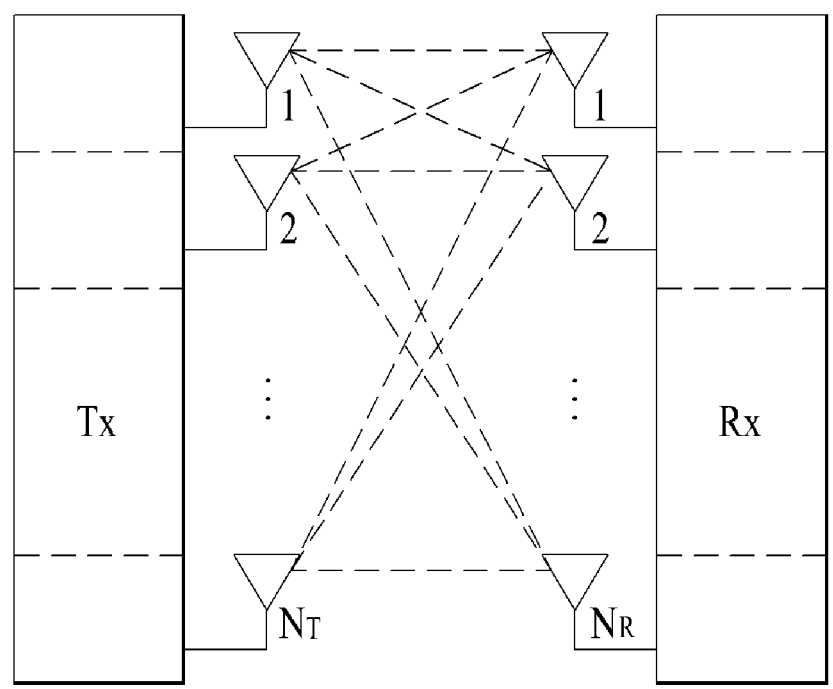
FIG. 5 is a diagram for a configuration of a general multi-antenna (MIMO) communication system.

FIG. 5 is a diagram for a configuration of a general multi-antenna (MIMO) communication system.

$N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_o$, the transmission rate in case of using multiple antennas may be theoretically raised by a result from multiplying the maximum transmission rate $R_0$ by a rate increasing rate $R_i$, as shown in equation 1. In this case, $R_i$ is a smaller one of $N_T$ and $N_R$.

$$R_i = \min(N_T, N_R) \quad [\text{Equation 1}]$$

For instance, in an MIMO communication system, which uses 4 transmitting antennas and 4 receiving antennas, it may be able to obtain a transmission rate 4 times higher than that of a single antenna system.

The above explained MIMO system assumes that the transmitter in a wireless communication system knows the channel. For some transmission schemes (e.g. STC, alamouti method), there is no need to know the channel, but it cannot be generalized. Thus, there is need for channel estimation for MIMO, so the receiver/transmitter may transmit reference signals (RSs) for this purpose.

For channel estimation without interference, the RSs of multiple transmitters should be orthogonal to each other. If there is a correlation between the RS from the first transmitter to the first receiver and the RS from the second transmitter to the second receiver, the channel estimation at the first receiver may reflect not only the channel from the first transmitter to the first receiver but also the channel from the second transmitter to the first receiver. It can be said that the channel from the first transmitter to the first receiver is contaminated by the channel from the second transmitter to the first receiver. And, this can be also said as 'pilot contamination'.

The above explained pilot contamination may limits the link performance due to the error caused by this contamination, so even when the transmitter raise the transmission power, the link performance cannot be improved above a certain limit. So, the reference signals transmitted at certain timing should be orthogonal to each other.

Based on this, the concept of massive MIMO system of the present application will be explained.

Recently, the massive MIMO scheme got lots of attention as a candidate constituent technology for 5G mobile communication system. This massive MIMO scheme can be employed to the system including a base station having multiple antennas and UEs having one antenna. Even though each UE has only one antenna, the entire system can be viewed as MIMO system when multiple UEs served by the base station having multiple antennas. If we assume that the number of UEs is K, the gradation of capacity in high SNR may be expressed as $\min(N_t, K)$.

The number of antennas for the base station can be unlimited. But, practically, we can suppose that the number of antennas of a base station exceed a certain threshold number, in order to distinguish the massive MIMO scheme from the conventional MIMO scheme. This threshold value can be 4 or 8, for example, but we suppose the case when the number of antenna for one base station is much more than this exemplary threshold number.

Theoretically, when the number of antennas for one base station goes to infinite, the optimal transmission algorism of the base station may be MRT (maximal ration transmission), and optimal reception algorithm may be MRC (maximal ration combining). These MRT and MRC are simple, but the performance of these schemes is limited when the conventional MIMO scheme is used, because these schemes do not consider the interference. However, when the number of antennas for one base station goes to infinite, the above drawback is addressed. Also, if the number of antennas increases, the beam from one antenna can be sharp, so the signal from that antenna can be carried to the received without giving interference to other receivers.

On the other hand, in order to efficiently employ the above mentioned massive MIMO scheme, the preferred embodiment of the present application assumes the use of TDD (Time Division Duplex) instead of FDD (Frequency Division Duplex).

FIG. 6 shows a case when the base station having 4 antennas transmits cell-specific reference signal for channel estimation.

In order to perform downlink channel estimation in a wireless communication system employing FDD scheme, the base station shall transmits reference signals through each of the multiple antennas, and the UE shall feedback the channel status for each of the channels from each of antennas. FIG. 6 is for the case when the base station having 4 antennas transmits reference signals ($R_0$, $R_1$, $R_2$ and $R_3$) to each of the antenna ports 0, 1, 2 and 3. As can be seen from FIG. 6, the reference signals for different antennas take different resource elements in the time-frequency resource. Thus, when the number of antennas severely increases, the reference signal overhead shall severely increases.

Figure 7:
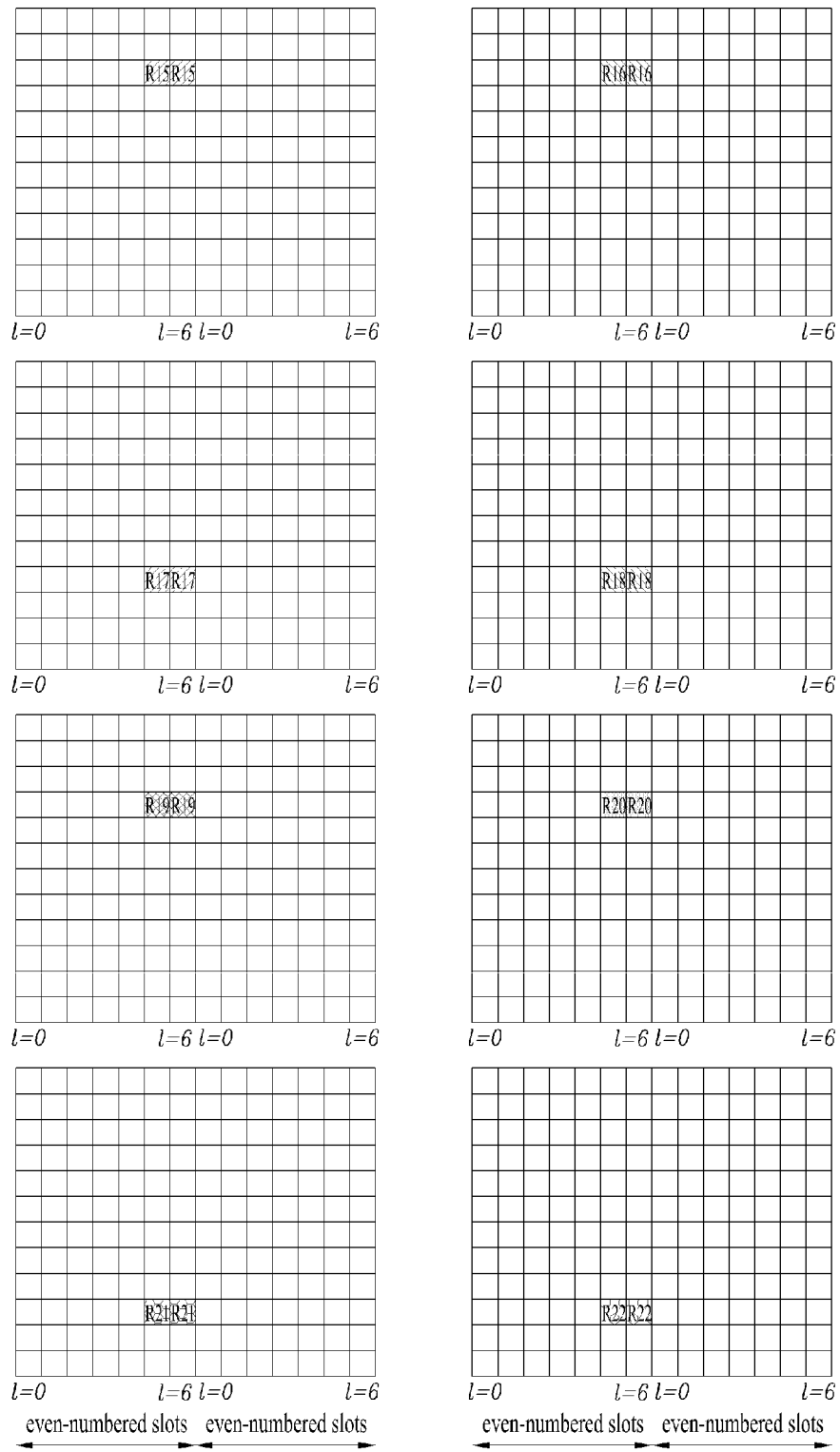
FIG. 7 shows a case when the base station having 8 antennas transmits CSI-RS for channel estimation.

FIG. 7 shows a case when the base station having 8 antennas transmits CSI-RS for channel estimation.

CSI-RS (Channel Status Information Reference Signal) is introduced to reduce the reference signal overhead. As can be seen from FIG. 7, the base station having 8 transmission antennas (antenna ports 15-22) may transmits the CSI-RSs via each of the antennas with reduced amount of resource when compared to the use of cell specific reference signal as shown by FIG. 6. Thus, one possible example of the present invention may use CSI-RS to estimate downlink channel, when the above explained massive MIMO is employed. However, in a preferred embodiment of the present application, the TDD scheme is employed and the uplink reference signal can be used to estimate downlink channel.

Figure 8:
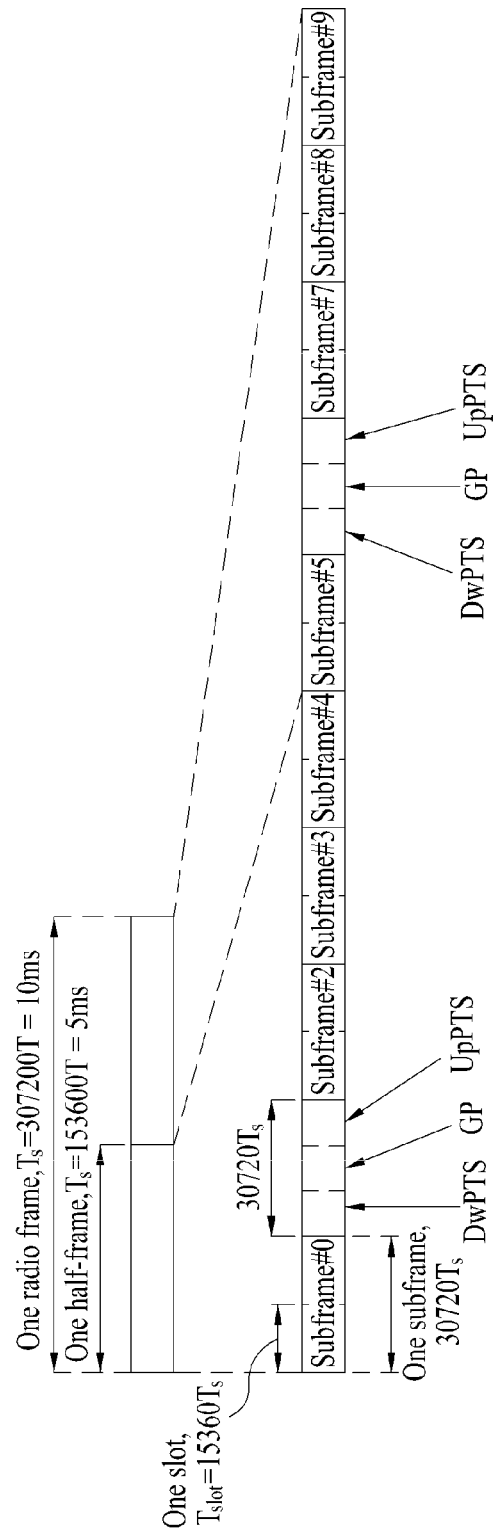
FIG. 8 shows a frame structure in a wireless communication system employing TDD scheme.

FIG. 8 shows a frame structure in a wireless communication system employing TDD scheme.

When FDD scheme is used, the downlink frequency band is different from the uplink frequency band. Thus, the estimation of the downlink channel is completely different from the estimation of the uplink channel. However, when the TDD scheme is used, the frequency band of the downlink channel is the same as that of uplink channel, thus we can use the uplink reference signal to estimate the downlink channel.

FIG. 8 is an example of the frame structure of one preferred embodiment of the present invention employing TDD scheme. Each radio frame of length $T_f = 307200 \cdot T_s = 10$ ms consists of two half-frames of length $153600 \cdot T_s = 5$ ms each. Each half-frame consists of five subframes of length $30720 \cdot T_s = 1$ ms. The supported uplink-downlink configurations are listed in [Table 1] where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by [Table 2] subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

| Special subframe configuration | DwPTS | Normal cyclic prefix in downlink | | DwPTS | Extended cyclic prefix in downlink | |
|---|---|---|---|---|---|---|
| | | UpPTS | | | UpPTS | |
| | | Normal cyclic prefix in uplink | Extended cyclic prefix in uplink | | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Uplink-downlink configurations with both 5 ms and 10 ms downlink-to-uplink switch-point periodicity are supported.

In case of 5 ms downlink-to-uplink switch-point periodicity, the special subframe exists in both half-frames.

In case of 10 ms downlink-to-uplink switch-point periodicity, the special subframe exists in the first half-frame only.

Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least 1456·$T_s$.

In case multiple cells with different uplink-downlink configurations are aggregated and the UE is not capable of simultaneous reception and transmission in the aggregated cells, the following constraints apply:
- if the subframe in the primary cell is a downlink subframe, the UE shall not transmit any signal or channel on a secondary cell in the same subframe
- if the subframe in the primary cell is an uplink subframe, the UE is not expected to receive any downlink transmissions on a secondary cell in the same subframe
- if the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

By using the above explained frame structure for TDD scheme, the present embodiment may use the uplink reference signal to estimate the downlink channel. Further, the number of RSs does not have to increase when the number of antennas for one base station increase, and there is no need for the UEs to feedback the channel status information to the base station.

However, when the wireless communication system expends to multi-cell, the number of UEs shall increase, thus the number of orthogonal sequences for the uplink reference signals should increase to support it. But, there is a limit on the number of orthogonal sequences, thus when the number of orthogonal sequences is fewer than the number of UEs, there still may be the above explained pilot contamination problem.

To address this problem, one preferred embodiment of the present invention assumed UE grouping based reference signal transmission as explained below.

Figure 9:
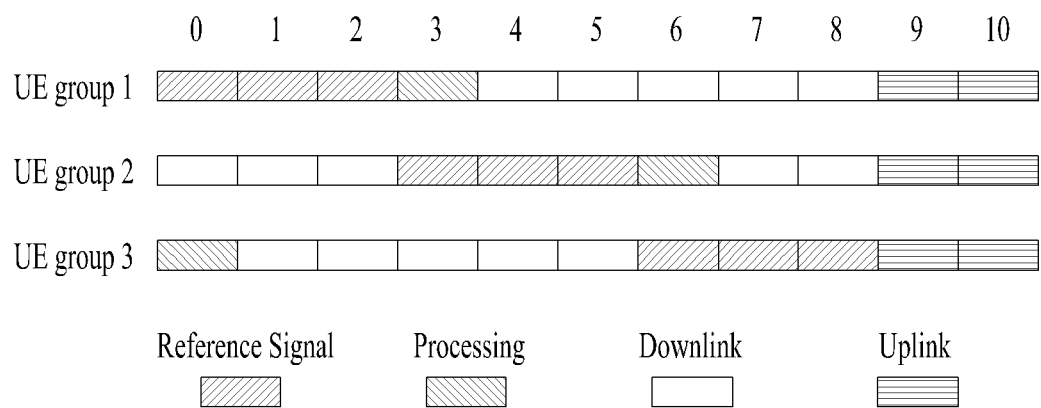
FIG. 9 shows UE grouping based reference signal transmission scheme according to one embodiment of the present invention.

FIG. 9 shows UE grouping based reference signal transmission scheme according to one embodiment of the present invention.

In this embodiment, the UEs in the wireless communication system may be grouped into multiple UE groups (e.g. UE group 1, UE group 2 and UE group 3 as shown in FIG. 9). UEs within the same UE group use orthogonal sequences for uplink reference signal orthogonal to each other. So, there is no pilot contamination problem for channel estimation.

Each UE group is synchronized with the base station with different timing. And, UEs of different UE groups may transmit uplink reference signals at different uplink transmission time units. For example, UE 1 of UE group 1 may transmits uplink sounding reference signal at subframes 0, 1 and 2 while UE 2 of UE group 2 receives downlink signal from the base station. The time units of FIG. 9 can be slot, subframe or equivalents. When the RS from UE 1 of UE group 1 is received by the base station, the base station may process it at subframe 4 while UE 2 of UE group 2 transmits uplink reference signals. When all the UE groups served by the base station (or base stations for Multi-BS operation) are synchronized with the base station(s), the UEs may transmits uplink data (e.g. from subframe 9 at FIG. 9).

The advantage of the above mentioned scheme will be explained.

Suppose there are two cells 'A' and 'B', and two UEs 'a' and 'b' within cells A and B, respectively. The channel $h_{mn}$ represents the channel between the $m^{th}$ base station and $n^{th}$ UE. The noise is not considered for convenience of explanation. In this case, when the base station A estimate the channel when the UEs a and b transmits SRS (sounding reference signal), the estimated channel can be expressed as $\hat{h}_{Aa} = \alpha_1 h_{Aa} + \alpha_2 h_{Ab} = \alpha_1 h_{Aa} + \alpha_2 h_{Ab}$. Here, α1 and α2 represent constant values. It can be said that the above estimated channel is contaminated by $\alpha_2 h_{Ab}$.

If the base station A receives data from UE a and UE b sending $\{d_a, d_b\}$, the result of MRC filter may be expressed as:

$$\frac{1}{N_t} \hat{h}_{Aa}^H (d_a h_{Aa} + d_b h_{Ab}) = \quad \text{[Equation 2]}$$

$$\frac{1}{N_t}(\alpha_1 h_{Aa}^H + \alpha_2 h_{Ab}^H)(d_a h_{Aa} + d_b h_{Ab}) =$$

$$\frac{\alpha_1 d_a}{N_t}\|h_{Aa}\|^2 + \frac{\alpha_2 d_b}{N_t}\|h_{Aa}\|^2 + \frac{\alpha_1 d_b}{N_t} h_{Aa}^H h_{Ab} +$$

$$\frac{\alpha_2 d_a}{N_t} h_{Aa}^H h_{Aa} \xrightarrow[N_t \to \infty]{} \frac{\alpha_1 d_a}{N_t}\|h_{Aa}\|^2 + \frac{\alpha_2 d_b}{N_t}\|h_{Ab}\|^2$$

In the above [equation 2], it can be recognized that the term $$\frac{\alpha_2 d_b}{N_t}\|h_{Ab}\|^2$$

does not arrive to 0 even when the number of antennas becomes infinite. So, there will be a performance degradation due to the pilot contamination.

However, when the above explained UE grouping based scheme is used, only one UE (e.g. UE a) transmit SRS while the other UE (e.g. UE b) does not transmit SRS. Suppose that the UE b receives data from the base station B while the UE a transmits SRS. In this case, the channel estimation at base station A can be expressed as:

$$\hat{h}_{Aa} = \alpha_1 h_{Aa} + \alpha_2 h_{AB} \quad \text{[Equation 3]}$$

It should be noted that the term $h_{Ab}$ is replaced by $h_{AB}$, since the base station B transmits data when the UE a transmits reference signal. If the base station A receives data from UE a and UE b sending $\{d_a, d_b\}$, the result of MRC filter may be expressed as:

$$\frac{1}{N_t} \hat{h}_{Aa}^H (d_a h_{Aa} + d_b h_{Ab}) = \quad \text{[Equation 4]}$$

$$\frac{1}{N_t}(\alpha_1 h_{Aa}^H + \alpha_2 h_{AB}^H)(d_a h_{Aa} + d_b h_{Ab}) =$$

$$\frac{\alpha_1 d_a}{N_t}\|h_{Aa}\|^2 + \frac{\alpha_2 d_a}{N_t} h_{AB}^H h_{Aa} + \frac{\alpha_1 d_b}{N_t} h_{Aa}^H h_{Ab} +$$

$$\frac{\alpha_2 d_a}{N_t} h_{AB}^H h_{Ab} \xrightarrow[N_t \to \infty]{} \frac{\alpha_1 d_a}{N_t}\|h_{Aa}\|^2$$

It should be noted that the interference become 0 when the number of antenna become infinite. So, by using the UE grouping based RS transmission scheme, the pilot contamination problem can be addressed while the number of orthogonal sequences is limited.

The above mentioned UE grouping based RS scheme can be more improved by the following scheme.

When the UEs within the same UE group transmit orthogonal sequences orthogonal to each other, the base station can easily distinguish each channel from each other. But, when the number of orthogonal sequences is limited, the UEs within one UE group may not be allocated orthogonal sequences. In this case, the base station cannot distinguish the channels from each other.

The above problem becomes more serious when the UE has multiple antennas. Suppose there are N orthogonal sequences and each UE has Nr antennas. In this case, UE can transmit/receive Nr independent signals at the same time. And, the network can support only N/Nr UEs within one UE group.

In the same example, when the network allocates only Nr/2 sequences to each UE, the network can support 2N/Nr UEs within one UE group. This can be a tradeoff between the number of data the UE can receive/transmit simultaneously and the number of UE supported within one UE group.

Based on this, one embodiment of the present invention proposes to use antenna combining scheme to increase the number of UEs supported within one UE group.

Figure 10:
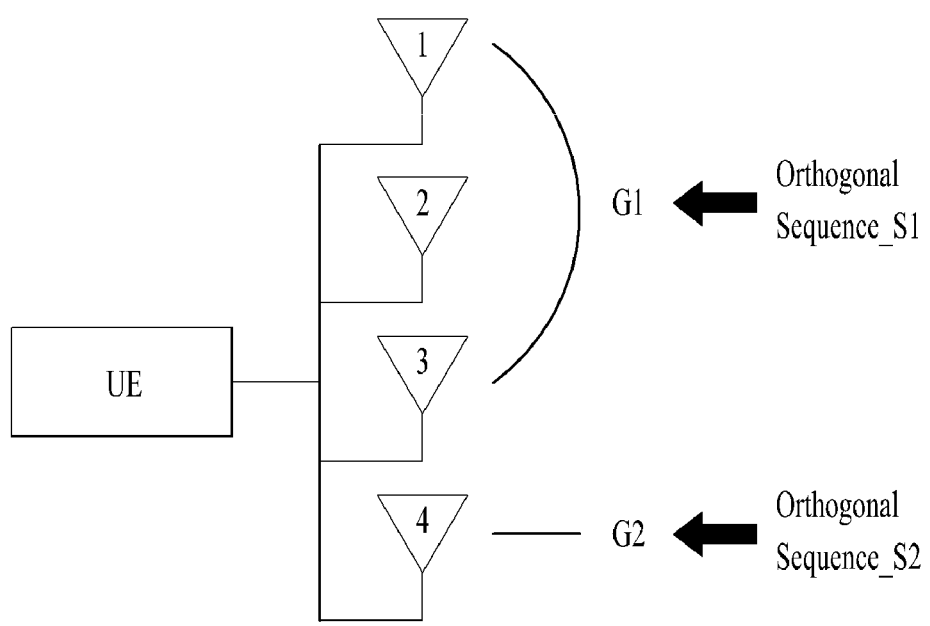
FIG. 10 shows antenna combining scheme according to one embodiment of the present invention.

FIG. 10 shows antenna combining scheme according to one embodiment of the present invention.

In this embodiment, the number of sequences allocated to each UE is less than the number of antennas of each UE. But, to mitigate the performance degradation, the antennas of each UE are combined for transmitting the pilots. Signals other than the pilots can be transmitted via each of the multiple antennas. So, the network can meet the requirement of the channel capacity and can support more number of UEs within one UE group.

In an example shown in FIG. 10, the UE has 4 antennas. The UE of this example receives antenna combining information from the base station. In this example, suppose the antenna combining information combines antennas 1, 2 and 3 into group 1 (G1) and antenna 4 as group 2 (G2). The base station of this example allocates each of orthogonal sequences to each of the antenna groups. So, orthogonal sequence S1 is allocated to antenna group 1 (G1) and orthogonal sequence S2 is allocated to antenna group 2 (G2).

The UE of this example may transmit pilot signals using the allocated orthogonal sequences for each of the antenna groups. So, the UE transmits pilot using S1 via antenna group 1 (G1) and transmits pilot using S2 via antenna group 2. The base station may determine this antenna combining information based on the pilot signals transmitted by each of the antennas of the UE not grouped. Also, the UE may inform the network of the preferred antenna combining for transmitting SRS.

Here, 'antenna combining' may mean establishing logical antennas based on multiple physical/logical antennas. For example, when a UE has 4 physical antennas, 2 antenna groups can be defined as:

$$[h_1 \; h_2 \; h_3 \; h_4] \to [g_1 \; g_2] \quad \text{[Equation 5]}$$

$$g_1 = \sum_{m=1}^{2} w_m h_m, \; g_2 = \sum_{m=3}^{4} w_m h_m$$

Here, $h_m$ represents the channel between $m^{th}$ physical channel of the UE and the base station. $g_m$ represents the logical channel between $m^{th}$ logical channel of the UE and the base station. $w_m$ represents weight value for $h_m$, and it can be determined by the base station. Signaling to inform the UE of the $h_m$ may be required. Or, it may be predetermined. The above $g_m$ may be called as 'effective channel' comparing to the physical channel of $h_m$.

According to one embodiment of the present invention, each effective channel can have any number of physical antennas. For example, $g_1$ and $g_2$ may correspond to $\{h_1, h_2, h_4\}$ and $\{h_3\}$, respectively.

The UE of this example may transmit pilot based on the above antenna combining. The base station may estimate channel based on the received pilot. It should be noted that the base station of this example can estimate not only the uplink channel, but also downlink channel when the above explained TDD scheme is used.

The above example can be explained with more details.

Suppose that the UE has 4 antennas. The base station may transmits antenna combining information to the UE combining the 4 antennas into 2 antenna groups with 2 sequences ($t_1$ and $t_2$) and weight vector of $[w_1\ w_2\ w_3\ w_4]$. The UE of this example may transmit pilot with the above sequences and the weight vector. These pilots received at the base station can be represented as following:

$$R = \sum_{m=1}^{2} h_m(w_m t_1^T) + \sum_{m=3}^{4} h_m(w_m t_2^T) + W, \text{ for } R, W \in \square^{N_B \times \tau}$$

$$= \left(\sum_{m=1}^{2} h_m w_m\right) t_1^T + \left(\sum_{m=3}^{4} w_m h_m\right) t_2^T + W$$

$$= g_1 t_1^T + g_2 t_2^T + W$$

[Equation 6]

In the Equation 6, W represents noise matrix. And, the sequences transmitted via 4 antennas are $\{w_1 t_1\ w_2 t_1\ w_3 t_2\ w_4 t_2\}$. That is, the UE transmits sequence $t_1$ via antennas 1 and 2, and transmits sequence $t_2$ via antennas 3 and 4. The base station can estimate channels based on the sequences ($t_1$ and $t_2$) as following.

$\hat{g}_1 = R t^*_1 = (g_1 t_1^T + g_2 t_2^T + W) t^*_1 = g_1 + W t^*_1$ $\hat{g}_2 = R t^*_2 = (g_1 t_1^T + g_2 t_2^T + W) t^*_2 = g_2 + W t^*_2;$ [Equation 6]

By this, the base station estimates 2 logical (effective) channels instead of 4 physical channels from the UE. By this scheme, the number of orthogonal sequences can be effectively reduced. So, if the channel capacity requirement of the UE can be met by using the logical channels (effective channels) instead of physical channels, the network can support more UEs with limited number of sequences.

In the above examples, the sequences for pilots are supposed as orthogonal sequences. But, in some situation, sequences other than orthogonal sequences can be used for pilot signals (e.g. quasi-orthogonal sequence).

The procedures to implement the above antenna combining scheme is explained in detail.

Figure 11:
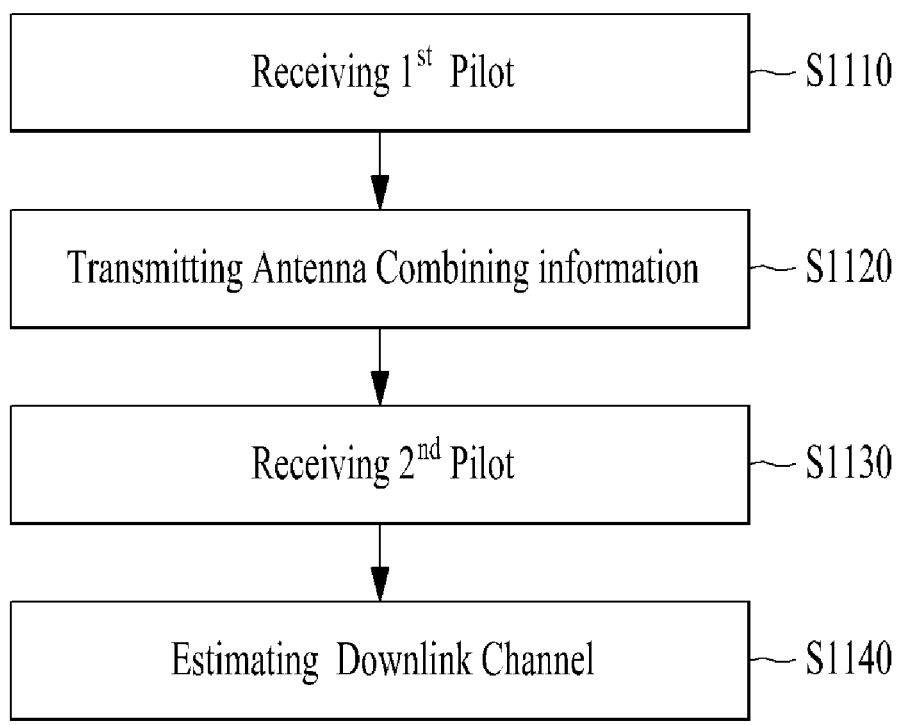
FIG. 11 is a diagram for explaining procedure for antenna combining according to one embodiment of the present invention.

FIG. 11 is a diagram for explaining procedure for antenna combining according to one embodiment of the present invention. FIG. 11 is explained in view of the base station (eNB), but the operation of the UE can be easily understood by the following explanation.

The base station may receive $1^{st}$ pilot signals from a UE via multiple antennas of the UE (S1110). Here, this $1^{st}$ pilot signals are transmitted without antenna combining and are used for the base station to determine the antenna combining information of the one embodiment of the present invention.

For example, suppose the UE has 4 physical antennas. When the UE transmits 4 orthogonal sequences via each of 4 physical antennas, the base station may estimate physical channels of $[h_1\ h_2\ h_3\ h_4]$. In this example, the base station may determine the antenna combination $g_1$ and $g_2$ based on $[h_1\ h_2\ h_3\ h_4]$.

This $1^{st}$ pilot signal can be transmitted by the UE even after the UE configure the antenna combination $g_1$ and $g_2$. In this case, the base station may configure new antenna combination $g_3$. The new antenna combination $g_3$ can be based on the previous antenna combination $g_1$ or $g_2$. In this case, the concept of the antenna combination can comprises mapping between one logical channel and another logical channel.

Based on this, the base station may determine antenna combining information and transmit it to the UE (S1120). The base station may determine the antenna combining information to make each of the logical (effective) channels become orthogonal to each other.

When the base station acquires 2 effective channels as stated above, the base station may transmits 2 independent steams (layers) using MRT. But, if the 2 effective channels are not orthogonal to each other, there shall be interference from each other. In this case, the received signals at the UE can be expressed as following:

$$r = \begin{bmatrix} g_1^T \\ g_2^T \end{bmatrix} [g_1^* g_2^*] \begin{bmatrix} s_1 \\ s_2 \end{bmatrix} + w = \begin{bmatrix} \|g_1\|^2 & g_1^T g_2^* \\ g_2^T g_1^* & \|g_2\|^2 \end{bmatrix} \begin{bmatrix} s_1 \\ s_2 \end{bmatrix} + w,$$

for $r, w \in \square^{2 \times 1}$

[Equation 7]

In the above equation, s1 and s2 represents the data symbols transmitted, and w represent noise vector. In this case, SINR of the $1^{st}$ stream can be expressed as following.

$$SINR_1 = \frac{\|g_1\|^4 \varepsilon_s}{|g_1^T g_2^*|^2 \varepsilon_s + \sigma_w^2},$$

for $E[|s|^2] = \varepsilon_s, \frac{1}{2} E[\|w\|^2] = \sigma_w^2$

[Equation 8]

From the Equation 8, it can be seen that the smaller the correlation between $g_1$ and $g_2$ is, the larger the SINR becomes. So, the base station of the preferred example determines the antenna combination g1 and g2 to minimize the correlation value of $|g_1^T g^*_2|^2$.

In another example of the present invention, the UE may request reconfiguration/modification of the antenna combining information when the SINR of the received signals become poor over a predetermined period of time. Based on this request, the base station may determine the antenna combining information again and transmit it to the UE.

And, in another example of the present invention, the base station may determine the antenna combining information to minimize the biggest correlation value between the effective channels. Or, it may determine to make the biggest correlation value between the effective channels less than a threshold value. By doing this, the base station may prevent the antenna groups from being aligned in the same direction. Suppose that there are 2 UEs (UE a and UE b), and each of the UEs has 4 antennas. If 2 sequences are allocated to each of the UEs, the effective channels of each UE can be defined as following.

$$\{g_{a,1}, g_{a,2}\} = \left\{\sum_{m=1}^{2} w_{m,a} h_{m,a}, \sum_{m=3}^{4} w_{m,a} h_{m,a}\right\}$$ [Equation 9]

$$\{g_{b,1}, g_{b,2}\} = \left\{\sum_{m=1}^{2} w_{m,b} h_{m,b}, \sum_{m=3}^{4} w_{m,b} h_{m,b}\right\}$$

The base station of this example may determine the weights based on the following equation using the above metric.

$$\min_{\substack{\{w_{1,a}, w_{2,a}, w_{3,a}, w_{4,a}\} \\ \{w_{1,b}, w_{2,b}, w_{3,b}, w_{4,b}\}}} \max |g_{l,n}^H g_{k,m}|^2,$$ [Equation 10]

for $l \neq k$ or $n \neq m$

The above scheme of Equation 10 becomes more complex when the number of effective channels increases. So, in another example of the present invention, the weights can be determined for each UE based on the following equation.

$$\min_{\{w_{1,a}, w_{2,a}, w_{3,a}, w_{4,a}\}} |g_{a,1}^H g_{a,2}|^2, \quad \min_{\{w_{1,b}, w_{2,b}, w_{3,b}, w_{4,b}\}} |g_{b,1}^H g_{b,2}|^2$$ [Equation 11]

Based on this antenna combining information, the UE may transmit the $2^{nd}$ pilot via multiple antennas combined based on the received information (S1130). Based in this, the base station may estimate DL channels as well as UL channels (S1140). In one example of the present invention, the base station may modify the antenna combination based on the $2^{nd}$ pilot signals.

In one embodiment of the present invention, the UE may transmit the preferred antenna combining method to the base station. This preferred antenna combining information can be independently transmitted independent to transmitting the $1^{st}$ pilot signals. Or, this preferred antenna combining method can be transmitted instead of transmitting the $1^{st}$ pilot signals.

In one example, the UE may inform the base station of the preferred number of effective channels. Suppose there are 2 UEs (UE a and UE b) having 4 antennas. Further suppose that the UE a has lots of data to be transmitted/received while there are little for UE b. In this case, the UE a may request more number of effective channels while UE b request fewer number of effective channels.

In another example, the UE may determine the preferred antenna combining method based on the ACK/NACK of the received data. When the number of effective channels increases, the more diversity gain can be acquired. So, the UE of this example request more number of effective channels when the decoding results of the received data is NACK for certain number of time. Otherwise, the UE may request less number of effective channels.

In still another example, the UE may determine the preferred antenna combining method based on the estimated channel information. The signals transmitted by the base station can be received at the UE as following.

$$R = \begin{bmatrix} g_1^T \\ g_2^T \end{bmatrix} [P_1 P_2] \begin{bmatrix} s_1 & 0 & s_3 & 0 \\ 0 & s_2 & 0 & s_4 \end{bmatrix} +$$ [Equation 12]

-continued
$$W = \begin{bmatrix} g_1^T P_1 & g_1^T P_2 \\ g_2^T P_1 & g_2^T P_2 \end{bmatrix} \begin{bmatrix} s_1 & 0 & s_3 & 0 \\ 0 & s_2 & 0 & s_4 \end{bmatrix} + W$$

where $R \in \square^{N_r \times N_r}$, $W \in \square^{N_r \times N_r}$, $P_1 \in \square^{N_r \times 1}$, $P_2 \in \square^{N_r \times 1}$ Here, [$P_1$ $P_2$] represents precoding matrix, $s_1$, $s_2$, $s_3$, $s_4$ represent reference signal (RS). Based on this, the UE may estimate $$z_1 = \begin{bmatrix} g_1^T P_1 \\ g_2^T P_1 \end{bmatrix} \text{ and } z_2 = \begin{bmatrix} g_1^T P_2 \\ g_2^T P_2 \end{bmatrix}.$$

When the correlation coefficient $\|z_1^H z_2\|^2$ becomes large, the reception performance become poor. So, the UE of this example may request new antenna configuration when the $\|z_1^H z_2\|^2$ becomes more than a predetermined threshold value.

Or, the UE may use the SINR calculated based on $Z_1$, $z_2$. When the SINR become less than a predetermined threshold value, the UE may request new antenna configuration.

In another example, the UE may transmits preferred $\tilde{Z}_1$, $\tilde{Z}_2$ to the base station based on $Z_1$, $Z_2$. The base station of this example may determine the antenna combination that results in $\tilde{Z}_1$, $\tilde{Z}_2$.

The above preferred antenna combining methods of the UE can be controlled and granted by the network. The network shall consider not only the UE transmitted this preferred antenna combining method, but other UEs within the cell. Thus, the base station may override this received antenna combining method and determine it otherwise. For example, when the effective channel proposed by a first UE interfere with the effective channel of a second UE, the base station may determine the antenna combining information other than the proposed one, and inform the UE of it.

Figure 12:
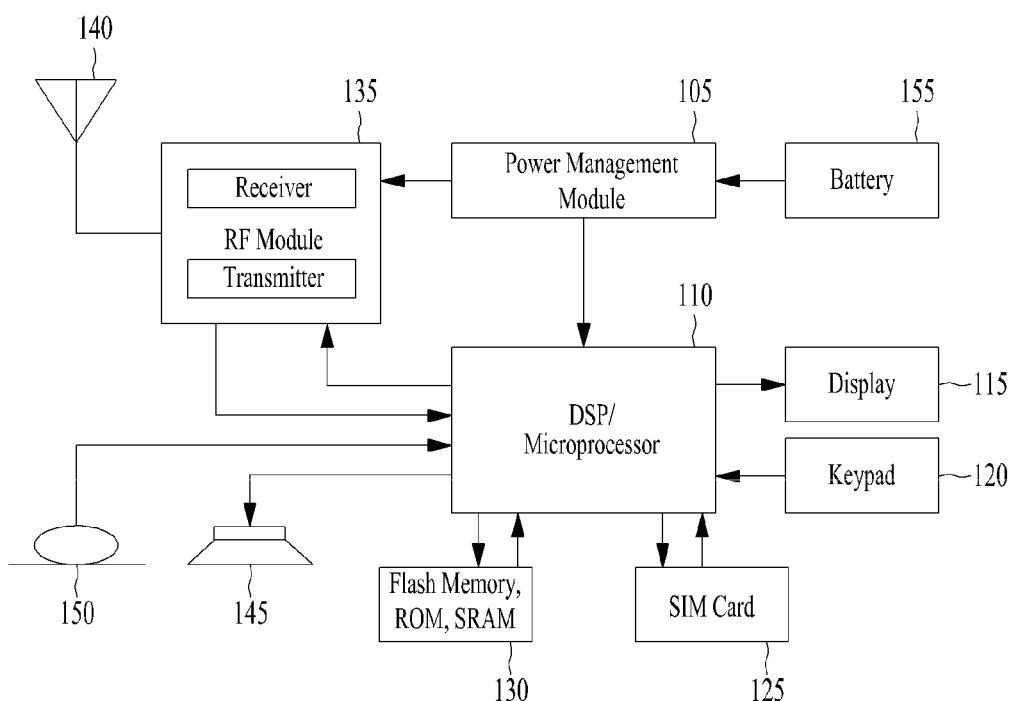
FIG. 12 is a block diagram of a communication apparatus according to an embodiment of the present invention.

FIG. 12 is a block diagram of a communication apparatus according to an embodiment of the present invention.

The apparatus shown in FIG. 12 can be a user equipment (UE) and/or eNB adapted to perform the above mechanism, but it can be any apparatus for performing the same operation.

As shown in FIG. 12, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) in a wireless communication system utilizing a massive MIMO (Multiple Input Multiple Output) scheme, the method performed by the UE and comprising:
 transmitting first pilot signals via each of multiple antennas of the UE;
 receiving antenna combining information from a base station (BS),
 the antenna combining information for combining the multiple antennas into one or more antenna groups and an orthogonal sequence allocated to each of the one or more antenna groups; and
 transmitting second pilot signals to the BS using the allocated orthogonal sequences,
 wherein the second pilot signals are used for estimating downlink channels from the BS to the UE,
 wherein the antenna combining information is determined based on correlation of each of the multiple antennas obtained from the first pilot signals, and
 wherein a same orthogonal sequence is applied to a second pilot signal transmitted via one or more of the multiple antennas belonging to a same antenna group.

2. The method of claim 1, wherein the antenna combining information is further determined to minimize a correlation between effective channels of the one or more antenna groups.

3. The method of claim 1, further comprising:
 determining a preferred antenna combining method based on an amount of data to be transmitted; and
 transmitting the preferred antenna combining method to the BS.

4. The method of claim 1, further comprising receiving modified antenna combining information from the BS, the modified antenna combining information based on the second pilot signals.

5. The method of claim 1, wherein the UE belongs to a first UE group and further comprising transmitting the second pilot signals during different time periods than a time period during which a UE of belonging to a second UE group transmits the second pilot signals.

6. The method of claim 1, wherein:
 the BS comprises multiple antennas; and
 a number of the multiple antennas is greater than a threshold number.

7. A method for a base station (BS) in a wireless communication system utilizing a massive MIMO (Multiple Input Multiple Output) scheme, the method performed by the BS and comprising:
 receiving first pilot signals transmitted via each of multiple antennas of a user equipment (UE);
 transmitting antenna combining information to the UE, the antenna combining information for combining the multiple antennas into one or more antenna groups and an orthogonal sequence allocated to each of the one or more antenna groups;
 receiving second pilot signals generated by using the allocated orthogonal sequences; and
 estimating a downlink channel from the BS to the UE based on the received second pilot signals,
 wherein the antenna combining information is determined based on correlation of each of the multiple antennas obtained from the first pilot signals, and
 wherein a same orthogonal sequence is applied to a second pilot signal transmitted via one or more of the multiple antennas belonging to a same antenna group.

8. The method of claim 7, wherein the antenna combining information is further determined to minimize a correlation between effective channels of the one or more antenna groups.

9. The method of claim 7, further comprising receiving a preferred antenna combining method from the UE, the preferred antenna combining method determined based on an amount of data to be transmitted by the UE.

10. The method of claim 7, wherein the UE belongs to a first UE group and further comprising receiving the second pilot signals from the UE during different time periods than a time period during which the second pilot signals are received from a UE of a belonging to a second UE group.

11. The method of claim 7, further comprising transmitting modified antenna combining information to the UE, the modified antenna combining information based on the received second pilot signals.

12. The method of claim 7, wherein:
 the BS comprises multiple antennas; and
 a number of the multiple antennas is greater than a threshold number.

13. A user equipment (UE) in a wireless communication system utilizing a massive MIMO (Multiple Input Multiple Output) scheme, the UE comprising:
 multiple antennas;
 a transceiver configured to transmit and receive signals via the multiple antennas; and
 a processor connected to the transceiver and configured to control the transceiver to:
 transmit first pilot signals via each of the multiple antennas;
 receive antenna combining information from a base station (BS), the antenna combining information for combining the multiple antennas into one or more antenna groups and an orthogonal sequence allocated to each of the one or more antenna groups; and
 transmit second pilot signals to the BS using the allocated orthogonal sequences,
 wherein the second pilot signals are used for estimating downlink channels from the BS to the UE,
 wherein the antenna combining information is determined based on correlation of each of the multiple antennas obtained from the first pilot signals, and
 wherein a same orthogonal sequence is applied to a second pilot signal transmitted via one or more of the multiple antennas belonging to a same antenna group.

14. A base station (BS) to operate in a wireless communication system utilizing a massive MIMO (Multiple Input Multiple Output) scheme, the base station comprising:
 multiple antennas;
 a transceiver configured to transmit and receive signals via the multiple antennas; and
 a processor connected to the transceiver and configured to control the transceiver to:
 receive first pilot signals transmitted via each of multiple antennas of a user equipment (UE);
 transmit antenna combining information to the UE, the antenna combining information for combining the multiple antennas of the UE into one or more antenna groups and an orthogonal sequence allocated to each of the one or more antenna groups;
 receive second pilot signals generated by using the allocated orthogonal sequences; and
 estimate a downlink channel from the BS to the UE based on the received second pilot signals, wherein the antenna combining information is determined based on correlation of each of the multiple antennas obtained from the first pilot signals, and wherein a same orthogonal sequence is applied to a second pilot signal transmitted via one or more of the multiple antennas belonging to a same antenna group.

15. The UE of claim 13, wherein the processor is further configured to:

determine a preferred antenna combining method based on an amount of data to be transmitted; and control the transceiver to transmit the preferred antenna combining method to the BS.

16. The UE of claim 13, wherein the processor is further configured to control the transceiver to receive modified antenna combining information from the BS, the modified antenna combining information based on the second pilot signals.

17. The UE of claim 13, wherein the UE belongs to a first UE group and the processor is further configured to control the transceiver to transmit the second pilot signals during different time periods than a time period during which a UE of belonging to a second UE group transmits the second pilot signals.

18. The BS of claim 14, wherein the processor is further configured to control the transceiver to receive a preferred antenna combining method from the UE, the preferred antenna combining method determined based on an amount of data to be transmitted by the UE.

19. The BS of claim 14, wherein the processor is further configured to control the transceiver to receive a preferred antenna combining method from the UE, the preferred antenna combining method determined based on an amount of data to be transmitted by the UE.

20. The BS of claim 14, wherein the UE belongs to a first UE group and the processor is further configured to control the transceiver to receive the second pilot signals from the UE during different time periods than a time period in which the second pilot signals are received from a UE of belonging to a second UE group.

* * * * *